E. B. FAHNESTOCK.
ELECTRIC SWITCH.
APPLICATION FILED JUNE 15, 1916.
1,386,694.
Patented Aug. 9, 1921.
2 SHEETS—SHEET 1.
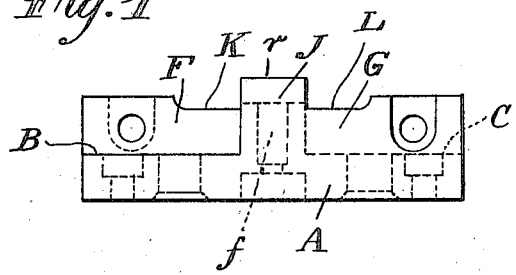
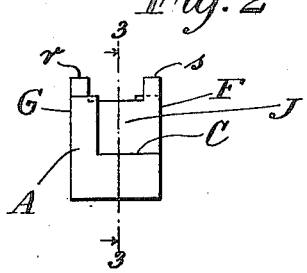
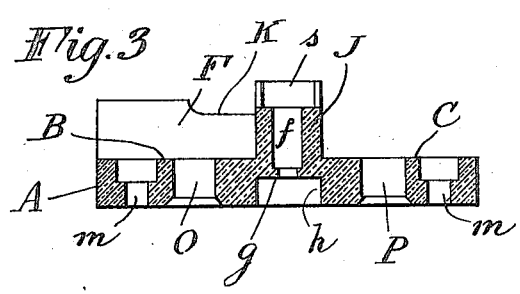
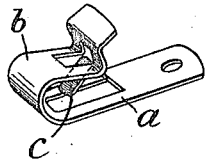
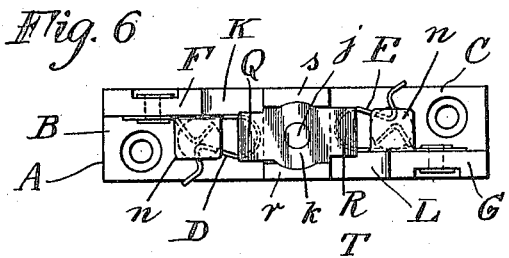
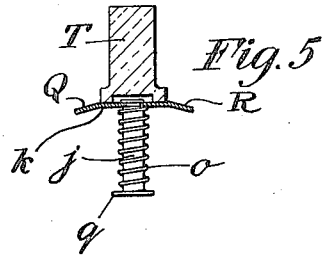
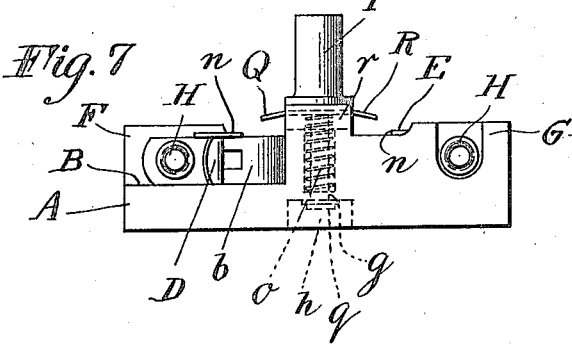
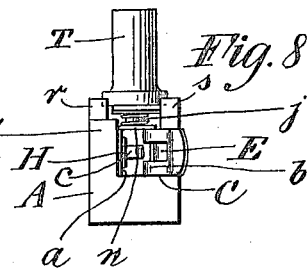
Ernest B. Fahnestock Inventor
By his Attorneys
Ogden & Sheldon

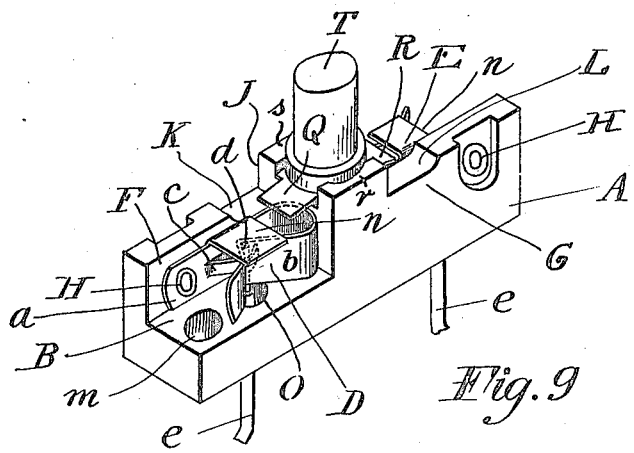
Fig. 9
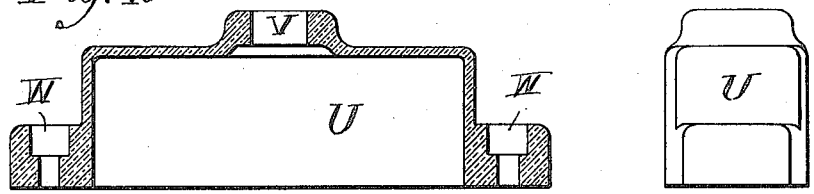
Fig. 10
Fig. 12
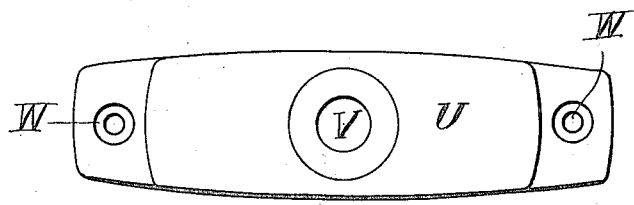
Fig. 11

UNITED STATES PATENT OFFICE.

ERNEST B. FAHNESTOCK, OF PLANDOME, NEW YORK; EDITH MARY JORDAN AND FRANCES HODGSON BURNETT, OF PLANDOME, NEW YORK, EXECUTORS OF THE WILL OF SAID ERNEST B. FAHNESTOCK, DECEASED.

ELECTRIC SWITCH.

1,386,694.　　　　　Specification of Letters Patent.　　Patented Aug. 9, 1921.

Application filed June 15, 1916. Serial No. 103,737.

*To all whom it may concern:*

Be it known that I, ERNEST B. FAHNESTOCK, a citizen of the United States, and a resident of Plandome, Long Island, New York, have invented certain new and useful Improvements in Electric Switches, of which the following is a specification, accompanied by drawings.

This invention relates to electric switches but more particularly to a switch of the push button type for making and breaking the circuit of conductors, although the constructive features of the device may be applied to switches of other types, without departing from the spirit of the invention.

In a small switch, even more than in a large one, difficulty is constantly experienced in holding and fastening the conductive wires securely within the switch structure, especially in cases in which the switch is subject to practically continuous vibration and jarring, as in subway, and railway trains, and in building constructions which are subject to great vibration.

My improvement, to overcome this objection, contemplates an arrangement of spring fastening devices for securely holding and gripping the conductors so that they cannot jar loose, in a subway train or trolley car, for instance, where the switches are also ordinarily subjected to hard usage. I then provide simple and efficient means for making and breaking contact with said fastening devices, in order to control the circuit of the conductors.

In those cases in which the conducting wires forming the circuit to be controlled are led into a recess or socket, which may be in the form of a junction box, in a supporting structure, it is difficult to connect up the switch, in the recess or junction box, owing to the limited space in which to work, and for this reason bad connections are frequently made and time is wasted which could be saved.

My switch is especially designed to enable ready connection to be made to the ends of wires which are difficult of access or inaccessible for a tool or pliers, because in my construction the ends of the conductors are simply slipped into the wire engaging portions of the fastening devices, and no tool is necessary. The act of seating the switch in its recess or upon the supporting structure permits the ends of the conductors to be inserted in the fastening devices, and gripped therein.

My switch is so arranged and constructed that the danger of short circuits within the switch structure is obviated or greatly reduced, and I am enabled to provide a form of contact device which makes highly efficient contact, preferably directly with portions of the fastening devices, and reduces the sparking at the contacts.

The invention will be understood by reference to the accompanying drawings showing a preferred form of the invention, in which—

Figure 1 is a side elevation of a form of insulating block for the switch, with the spring fastening devices and switch parts removed;

Fig. 2 is an end elevation of the block;

Fig. 3 is a longitudinal sectional elevation of the block on line 3—3 of Fig. 2;

Fig. 4 is a perspective view of a preferred form of spring fastening device for the switch, two of these being used in the form of the invention illustrated;

Fig. 5 is an elevation partly in longitudinal section, of a switching device in the form of a push button and adapted to be carried by the block;

Fig. 6 is a top plan view of the switch with the fastening devices and push button mounted thereon;

Fig. 7 is a side elevation of Fig. 6;

Fig. 8 is an end elevation of Fig. 7;

Fig. 9 is a perspective view of the switch, with conductors held by the fastening devices;

Fig. 10 is a longitudinal sectional elevation of a suitable protective cap or cover preferably of insulating material, as hard rubber, for the switch;

Fig. 11 is a top plan view of the said cap or cover, and

Fig. 12 is an end elevation of the same.

Referring to the drawings, A represents a block of suitable insulating material, preferably of elongated rectangular form, in the present embodiment of the invention, although different forms as desired may be used. In the example shown, the block is fashioned or cut away at opposite sides of each end to form recesses or seats B and C for spring fastening devices D and E, which may be of the well-known type shown in detail in Fig. 4, known as the "Fahnestock" clip and comprising the body member $a$, the spring member $b$, and the resistant member $c$. The ends $d$ of the conductors $e$ (shown in Fig. 9) are adapted as usual to be inserted between the retaining portions of the spring member and the resistant member and held in defined position. Obviously other spring fastening devices could be used, if desired, although the devices described are particularly suitable for the present invention owing to their construction.

By recessing the block A, as shown, protective and supporting walls F and G are provided to which the body members of the spring fastening devices may be conveniently secured, as by means of the rivets H, so that the edges of the body and spring members of the fastening devices lie in positions adjacent the central dividing portion J of the block A. The partition or portion J need not be centrally arranged on the block A, but the construction shown is convenient and economical and well adapted for the purposes of the invention. The base portion of the block A is provided with the apertures O and P for the ready insertion of the ends $d$ of the conductors $e$, and apertures $m$ for securing the block in place by suitable screws.

The webs or walls F and G are preferably cut away at K and L to permit the edges of the fastening devices to protrude beyond the walls and avoid interference with the contact portions Q and R of the contact device adapted to be mounted in the partition J and shown in detail in Fig. 5.

The central partition is preferably recessed throughout, as shown in Fig. 3 at $f$ and provided with a shoulder $g$ adjacent the recess $h$. As shown in detail in Fig. 5, a stem $j$ is provided with a flexible metallic plate $k$ at one end, and a retracting spring $o$, which is adapted to be compressed or held between the plate $k$ and the shoulder $g$ when the stem $j$ is placed in the recess $f$ in the block A. A nut or washer $q$ is placed over the end of the stem $j$ to retain the parts of the contact device in position, as readily understood from the drawings. A push button T of any suitable material or type bears upon the plate $k$.

Protective side flanges $r$ and $s$ are preferably provided on the partition J, and the contact portions Q and R of the plate $k$ project outwardly over the outermost edges of the fastening devices, but normally out of contact with the same, so that by pressing down upon the push button T, the wings or portions Q and R are brought into contact with the exposed edges of the fastening devices, and the circuit is bridged across. A wiping contact is made in this case, both on making and breaking the circuit, so that the contact surfaces are always kept clean automatically and good contact is insured. If desired, the wings or portions Q and R may be so arranged that contact will be made with one fastening device first and broken last, but whether or not this is done, sparking is reduced, owing to the form of the contacts and the plurality of breaks.

The fastening devices are shown in the example of the invention illustrated, held against the walls F and G with the bent or looped portions arranged inwardly and pointing toward each other, but obviously other arrangements could be devised without departing from the spirit of the invention. For instance, the fastening devices could be reversed and the looped portions could point outwardly, or else the body portions $a$ could be secured upon the base portions of the block in the recesses B and C, and the ends of the conductors could be brought in from the sides of the block through the walls F and G, if necessary, or advisable to meet certain specified conditions. These modifications are not illustrated, as they are sufficiently obvious to those skilled in the art.

Assuming that the conductors $e$, $e$ are wired into the framework of a subway or railway car, and it is desired to connect switches of the type illustrated herein at intervals in the circuits, then it is only necessary to insert the block A in the socket, recess or junction box provided for the purpose, and in the act of inserting the block, permit the ends $d$, $d$ of the conductors $e$, $e$ to pass through the apertures O and P in the base of the block, and into the wire retaining portions of the fastening devices D and E. For this purpose, the spring members of the fastening devices are flexed to permit the insertion of the ends of the conductors. The conductor ends are thus firmly gripped and cannot jar loose or readily break off with rough usage. A simple pressure on the push button T completes the circuit, and the spring $o$ retracts the push button when pressure is released.

As shown in Figs. 6, 7, 8 and 9, the spring fastening devices are preferably provided with stops $n$ in the form of metal tongues bent into position alongside of the resistant members $c$, to prevent the ends of the wires from being thrust too far through the fastening devices, and short circuits are thus guarded against.

Preferably, a cap or housing U which may be of hard rubber or other suitable material, is provided for the switch, as shown in Figs. 10, 11 and 12. This cap or cover may be of any desired shape, a convenient form of cap being shown in the drawings. The cap is provided with an aperture V to permit the push button T to project a sufficient distance, so that it may be conveniently manipulated, and apertures W may be provided in the cap for the insertion of suitable screws or other devices for holding the cap upon a base or other supporting structure.

I claim and desire to obtain by Letters Patent the following:

1. An electric switch comprising a block of insulating material having recesses for the reception of spring fastening devices for electrical conductors, said block also having apertures for the insertion of conductors to be gripped and held by the fastening devices, spring actuated switching means adapted to be moved to and from the said fastening devices, and flexible contact arms actuated by said switching means for making wiping contacts with the edges of said fastening devices.

2. An electric switch, comprising an elongated block of insulating material recessed at each end but on opposite sides of the block, and formed with a central dividing portion separating the recessed portions, spring fastening devices for electrical conductors mounted in each end recess, the base of the block being provided with apertures for the insertion of the conductors to be gripped and held by the fastening devices, a spring actuated push button mounted in the central dividing partition of the block, said button having outwardly extending spring contacts adapted to bridge across the space between the fastening devices and make contact with said devices.

3. An electric switch comprising a block of insulating material recessed to receive and hold spring fastening devices for electrical conductors, a push button carried by the block for completing and interrupting the circuit between said fastening devices, said block having apertures in its base for the insertion of the conductors to be held by the fastening devices, and a protective insulating cap adapted to be placed over said block and provided with an aperture through which the push button projects, so that it may be operated from outside the cap, said cap also having provision for securing the same upon or against a support and thereby holding the electric switch securely in desired position.

4. An electric switch comprising a block of insulating material having spring fastening devices mounted thereon for gripping and securely holding conductors, stops for limiting the distance to which the conductors may be inserted in the fastening devices, and contact means carried by the block for making and breaking the circuit between said spring fastening devices.

5. An electric switch comprising a block of insulating material provided with a plurality of apertures, a plurality of spring fastening devices mounted upon said block, each of said fastening devices being adapted to grip and hold a conductor and having the gripping portion thereof located substantially in alinement with one of said apertures to engage the conductors inserted in said apertures, and spring actuated flexible means adapted to electrically inter-connect said spring fastening devices.

6. An electric switch comprising a block of insulating material having a plurality of conductor receiving apertures therein, a plurality of spring fastening devices mounted upon said block and each device comprising a spring member and a resistant member, the point of inter-section of the spring member and of the resistant member of each of said fastening devices being located substantially opposite one of said conductor receiving apertures to engage the conductors inserted in said apertures, and manually operated spring actuated means for electrically inter-connecting said devices.

7. In an electric switch, a block of insulating material provided with a pair of recesses and a pair of apertures, a pair of spring fastening devices each mounted within one of said recesses and each composed of a single piece of metal bent back upon itself to form a spring member and a resistant member between which a conductor may be gripped substantially without distortion thereof, the longitudinal axes of said spring fastening members being located transversely to the line of the conductors at the points where said conductors enter their respective apertures in said block and are engaged by said spring fastening devices, and a spring actuated pair of flexible arms adapted to make electrical contact between said spring fastening devices.

In testimony whereof I have signed this specification in the presence of two subscribing witnesses.

ERNEST B. FAHNESTOCK.

Witnesses:
M. M. RIEMANN,
A. C. PARHAM.